United States Patent [19]

Brown

[11] Patent Number: 4,858,041
[45] Date of Patent: Aug. 15, 1989

[54] TRACKING SERVO CONTROL

[75] Inventor: Stewart C. Brown, Newport Beach, Calif.

[73] Assignee: Mattel, Inc., Hawthorne, Calif.

[21] Appl. No.: 110,995

[22] Filed: Oct. 20, 1987

[51] Int. Cl.⁴ ............................................. G11B 21/08
[52] U.S. Cl. ..................... 360/78.09; 369/32
[58] Field of Search ................ 360/78, 78.04–78.07, 360/78.09; 369/32, 33, 41, 44, 46, 111; 358/907; 364/149, 151

[56] References Cited

U.S. PATENT DOCUMENTS

| 4,138,663 | 2/1979 | Lehureau et al. | 369/41 |
| 4,481,613 | 11/1984 | Yokota | 369/44 |
| 4,482,992 | 11/1984 | Shimizu et al. | 358/907 |
| 4,484,319 | 11/1984 | Koishi et al. | 369/32 |
| 4,545,003 | 10/1985 | Hirano et al. | 369/44 |
| 4,575,776 | 3/1986 | Stephens et al. | 360/78.09 |
| 4,613,916 | 9/1986 | Johnson | 369/32 |
| 4,615,023 | 9/1986 | Inada et al. | 358/907 |
| 4,622,604 | 11/1986 | Hashimoto | 360/78.07 |

Primary Examiner—Donald McElheny, Jr.
Attorney, Agent, or Firm—Ronald M. Goldman; Melvin A. Klein; Daniel F. Sullivan

[57] ABSTRACT

In a disc drive head positioning system a reference signal generator synthesizes a real time analogue representation of a perfect signal as would be outputted by the tracking sensor during a theoretically perfect movement to the desired disc track, which is used as a reference; the analogue representation is subtractively combined with the actual signal generated by the sensor during movement; and the difference forms the error signal that controls the sensor's position.

15 Claims, 2 Drawing Sheets

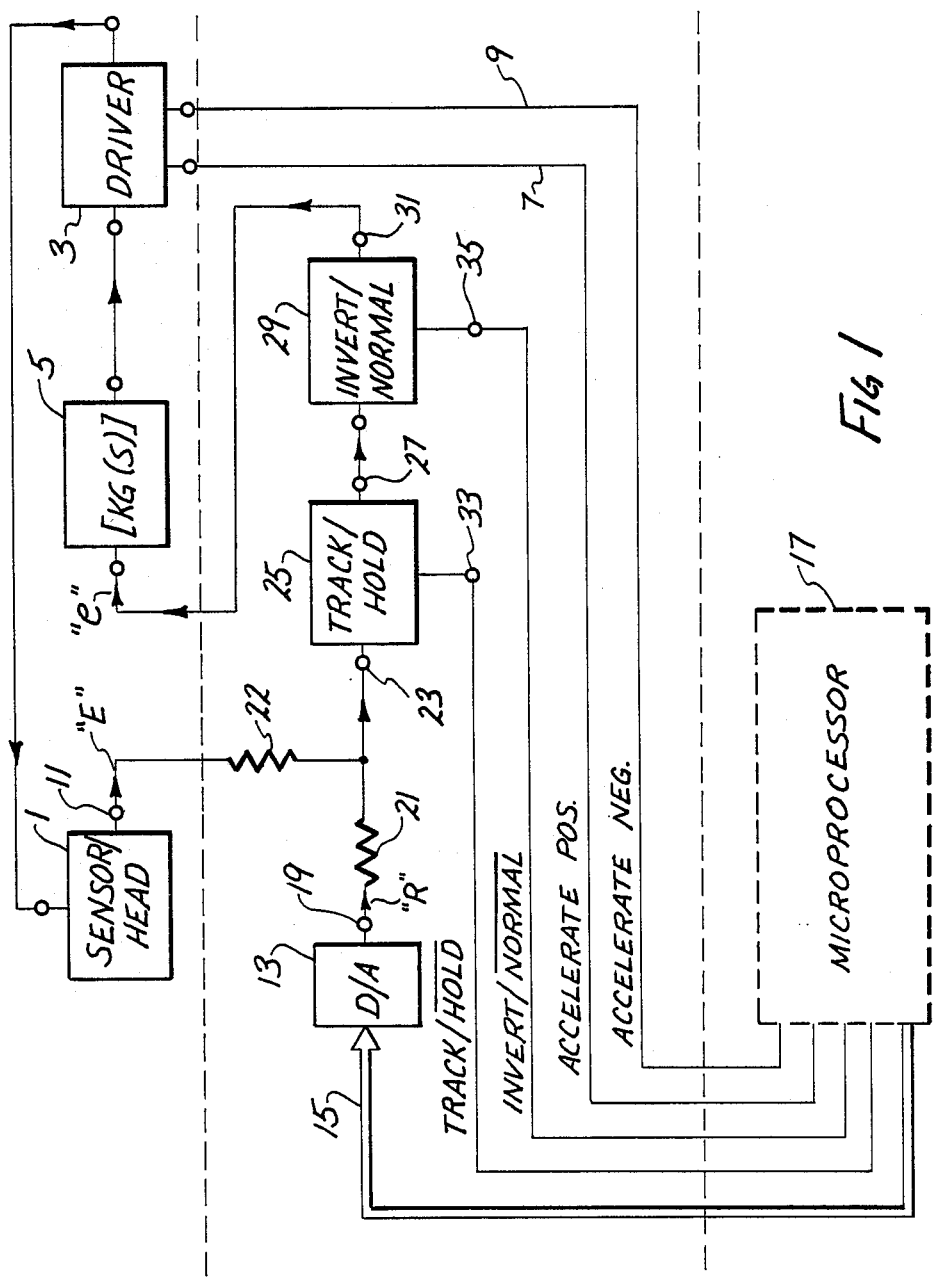

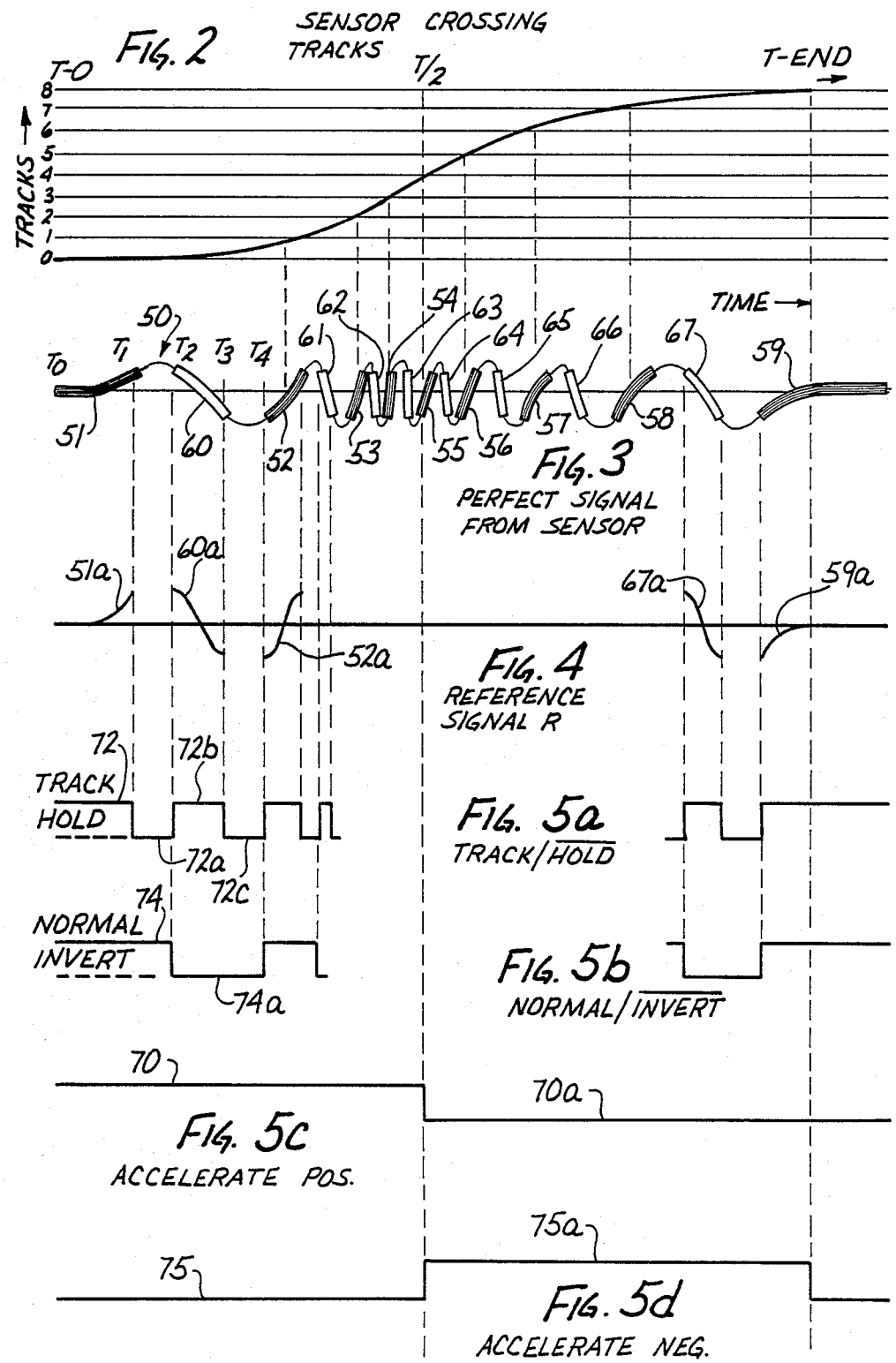

TRACKING SERVO CONTROL

FIELD OF THE INVENTION

This invention relates to memory devices and more particularly, to disc type storage drives that incorporate magnetic or optical discs as an information storage medium.

BACKGROUND OF THE INVENTION

Electronic members are used to store large quantities of digital data and other information used in computers and other computerized electronic devices in which large amounts of information need to be recorded and/or retrieved and displayed upon a cathode ray tube or other video display device. In more recent years, forms of digital storage devices have been incorporated within computerized entertainment devices such as those used for presenting video information, pictures as well as digitally stored music. A typical form of storage device employs a rotatable storage medium or "disc", either permanently housed within the device or which is removable and may be removed and replaced by another disc; and a transducer or "head" by means of which the information stored on the disc is interrogated or "read out" and coupled to other devices in the system. Disc drives of this type include magnetic disc drives in which the discs are of magnetic material and in which the information is stored in the form of magnetic flux, whereby the information is read out by magnetic type transducer means, and optical disc drives in which the information is stored in the form of pits or other broader optical discontinuities in the disc material and in which a readout is accomplished by light transducer means, typically a laser diode and photodetector combination. The information is arranged and stored in the "tracks" located on the disc. Those tracks may be in the form of a continuous spiral track or a series of concentric circular tracks.

Information is stored by filling the disc tracks with closely spaced disc continuities; so called "pits" for optical discs, magnetic flux reversals for magnetic discs. In a typical arrangement for an optical disc, there may be approximately 5,000–10,000 of such "pits" in each centimeter of circumferential track length.

The information stored is retrieved by a pick-up transducer, suitably a servo driven head which contains a sensor, either optical or magnetic. The servo positions the head over a selected track and the sensor reads the information previously stored on that track. In additional to reading the information on a particular track, a provision in the system provides rapid switching between one track and another, which may be spaced some distance apart on the disc; an action that is referred to as "seeking" in magnetic disc drives and/or "track jumping" in optical disc parlance. In the operation of a computerized device a "command" is given to procure certain information from within storage. Given the identifying information, the command causes the sensor to seek the track location in which the particular information is stored, following which, the head or sensor retrieves the stored information and returns it to the other electronic circuits within the computer for further processing or for display.

In particular, interactive video used that is often used for games, education, training, and the like, frequently requires a "branching" function; that is, instantaneous switching to a new scenario under user control. The branching is accomplished by interleaving a number of scenarios on the disc track. The user initiates a branch by causing the video disc player to execute "track jumps" in a sequence which selects one of the interleaved scenarios. In order to create a steady video image, the track jumps must be accomplished within the video display's vertical retrace inverval and the number of tracks in each jump must be precisely controlled.

The foregoing retrieval operations require that the head and sensor be moved rapidly in a radial direction with a controlled motion so that the sensor comes to rest over the desired track. Various technologies for accomplished sensor positioning in this arrangement are known and are in wide use. Those existing techniques are, however, either quite elaborate, typically requiring a separate channel for track jumping which is electronically switched in at the beginning of a track jump, followed by a switch out at the conclusion, or is of crude design in that only short track jumps can be executed with acceptable levels of precision. The present invention provides a relatively simple means to permit highly accurate track jumps of any length.

With existing technology, the first approach to head positioning is accomplished in a three-step process. First, the tracking servo loop is opened and an "accelerate signal" is applied to the sensor head. Second, at the mid-point of head travel between the two track positions, the signal applied to the sensor head is changed to a "decelerate" signal. And, at the conclusion of travel, the "decelerate" signal is removed and the tracking servo loop is closed which, ideally, leaves the sensor positioned over the correct disc track. Because there is no closed loop control of the sensor head during a track jump, this approach is believed to be suited only to short jumps.

The existing technology for long "jumps" or "seeks" contains some means for monitoring the movement of the sensor as it travels from its start position to the selected disc track. This uses a closed loop control insuring that the sensor remains on course, so to speak, and arrives at the correct track, even after lengthy travel. Typically, the velocity of the sensor movement is a parameter used for head positioning control. In addition, a technique for sampling position error once for each track crossing is presented in U.S. Pat. No. 4,547,822, granted to Stewart Brown, the present application.

An advantage of the present invention is that it avoids the need for an additional channel and the accompanying electronic hardware as in the case of the prior drives.

A principle object of the invention is to provide an improved control for positioning a moveable disc head transducer. A further object is to provide accurate track jumps under adverse conditions such as video disc with dust, fingerprints, etc., on the optical surface. A further object is to provide a disc head control circuit that accurately positions the head even over long jumps and is less expensive than existing techniques that perform that function. A still additional object is to provide a lowcost disc head position controller capable of accurately positioning the head.

SUMMARY

In accordance with the aforecited objects, the disc drive of the invention includes a reference signal generating means for sythesizing a signal that is a real time analogue representation of a "perfect signal", one that would be outputted from the tracking sensor during a perfect movement of the head to the specified disc track and, in effect, simulates the perfect signal as a reference. This reference signal is combined in a subtractive relationship with the actual signal generated by the sensor during its movement. The resulting difference signal is applied to the input of the tracking servo and functions as an error signal to control the sensor position during the track jump. As is apparent, in this system the existing tracking servo is employed, avoiding the need for an additional channel.

A further important advantage is that this difference signal is a *position* difference signal, and it is valid for a high percentage of time (as opposed to a signal derived only once per track crossing).

The foregoing advantages and objects of the invention, together with additional advantages, are better understood by giving consideration to the detailed description of the preferred embodiment, which follows in this specification, taken together with the illustrations thereof presented in the figures of the drawings.

DESCRIPTION OF THE DRAWINGS

In the Drawings:

FIG. 1 is a block diagram of the tracking servo control system in accordance with the invention;

FIG. 2 is a diagrammatic depiction of the servo head position relative to time when crossing a plurality of tracks of a disc, or the like;

FIG. 3 is a position versus time waveform showing an idealized or perfect signal from the sensor head of the system of FIG. 1, with portions of the waveforms highlighted in solid and open blocks, the waveform being correlated to the servo head position of FIG. 2 by vertical broken lines;

FIG. 4 is a partial analog waveform showing a reference signal derived from the waveform of FIG. 2, and correlated thereto by vertical broken lines;

FIG. 5a is a partial graphical depiction of a digital control signal for the track and hold circuit of the system of FIG. 1 correlated in time to the waveforms thereabove by vertical broken lines;

FIG. 5b is a partial graphical depiction of a digital control signal for the normal/invert circuit of the system of FIG. 1 correlated in time to the waveforms and control signals thereabove by vertical broken lines;

FIG. 5c is a partial graphical depiction of a digital control signal for the accelerate positive signal generated by the microprocessor circuit of the system of FIG. 1 correlated in time to the waveforms and control signals thereabove by vertical broken lines; and FIG. 5d is a partial graphical depiction of a digital control signal for the accelerate negative signal generated by the microprocessor circuit of the system of FIG. 1 correlated in time to the waveforms and control signals thereabove by vertical broken lines.

DETAILED DESCRIPTION OF THE PREFERRED EMBODIMENT

In a preferred form, the embodiment contains the sensor and head 1; a servo driver 3; and a transfer function generator 5. A positive accelerator signal input 7 and an accelerate negative or a decelerate signal input 9 are included and are coupled to the corresponding inputs of driver 3. The sensor head 1, contains an output 11, the tracking signal output which output 11 is designated "E", and is a serve head tracking signal. The elements described are found in conventional disc drives. As those skilled in the art appreciate, the various mechanical details of the disc or the sensor head positioning means and other aspects of the conventional structure depicted in block diagram form, may be of any conventional type and, hence, are not illustrated in detail in the drawings and are not further described.

A digital-to-analogue converter 13, has an input 15, coupled to associated equipment which equipment may include a microprocessor or other logic circuits for performance of the function to be described, which equipment is represented by dash line 17 and an output with the output 19 being, coupled by resistor 21 to the input 23 of track and hold circuit 25. In the drawings, the output 19 is designated "R", which is a reference signal as will be hereafter described. Output 27 of the track and hold circuit 25 is connected to the input of an invert/normal circuit 29. In turn, the output 31 of invert/normal 29 is coupled to the input of the servo transfer circuit 5. A second input 33 to track and hold circuit 25 is coupled to the associated equipment 17. A second input 35 to invert/normal circuit 29 is coupled to the output of the associated circuit 17. Circuit 17, represented in block form, contains the microprocessor and its associated program. The program contains the information which is processed to provide a reference signal in digital form in a waveform that meets the criteria elsewhere described in this specification. The program also contains the commands for applying, at appropriate intervals, a positive accelerate signal to lead 7, a negative accelerate, or decelerate signal to input 9, an invert/normal signal to input 35 and a track and hold signal to input 33.

The trajectory of the sensor head in a perfect jump over eight tracks of the disc, is illustrated in FIG. 2. There is a constant acceleration from the start, T-0, to the midpoint, T/2, followed by constant deceleration from the mid-point of travel, to the final position on the 8th track, T-End; FIG. 3 illustrates a frequency modulated quasi sinusoidal wave form outputted from the tracking sensor during the hypothetical perfect track jump in the example of FIG. 2.

FIG. 2 depicts a curve of servo head position relative to time as a function of track position, with the track being designated track "0" through track "8", this being used as an example to show an eight track jump of the servo head. This jump takes place between the times designated T-0 and T-END, with the mid-point of the cycle designated T/2.

FIG. 3 depicts an idealized or perfect waveform 50, which would be the output waveform from the servo head sensor 1 under ideal or perfect conditions. The waveform 50 is of a generally quasi-sinusoidal configuration, with this waveform 50 having segments thereof shown in blackened or solid blocks, e.g. 51–59, and other segments of the waveform depicted in open blocks, e.g., 60–67. The significance of this particular marking of the waveform relates to the correlation of the waveform segment to the track position of FIG. 2. For example, all solid or darkened blocks 51–59 depict segments of the waveform 50 relative to an "on-track position", while the open blocks 60–67 depict segments of the waveform 50 which correlate to the "inter-track" positions, that is, the servo head is between tracks of the disc.

With respect to the highlighted segments of waveform 50, the on-track segments 51–59 and the inter-track segments 60–67 are valid analogues of the instantaneous position of the servo head sensor 1. It is to be noted that the segments 51–59 have an ascending or positive slope, while the segments 60–67 have a descending or negative slope. These on-track and inter-track segments are then replicated to synthesize portions of a reference signal, in digital form, which portions are stored in the associated microprocessor circuit 17. The portions of the waveform 50 between these segments, that is, the tops and bottoms of the quasi-sinusoidal waveform 50, do not contain much useful information and, accordingly, those waveform portions are not used in connection with the generation of the reference signal.

Useful information extracted from this waveform 50, is shown by the truncated waveform of FIG. 4, which depicts the reference signal. By correlating, via the vertical broken lines, it can be seen, that solid line segment 51 of FIG. 3 corresponds to the segment 51a of FIG. 4, the open block segment 60 of waveform 50 corresponds to the segment 60a of FIG. 4, segment 52 corresponds to segment 52a, etc., with segments 67 and 59 of waveform 50 corresponding to segments 67a and 59a, respectively, in FIG. 4.

The on-track segments 51–59 and the inter-track segments 60–67 are replicated to synthesize the reference signal of FIG. 4 indicative of the perfect waveform. The inter-track segments 60–67 have a polarity opposite that of track segments 51–59 and, accordingly, for use, provision is made in the circuitry for taking this into consideration, that is, invert/normal circuit 29 is triggered by the associated circuit 17 to effect polarity reversal during the time the inter-track segments 60–67 are being used.

The reference signal R is depicted in FIG. 4. The reference signal is presented, as a digital signal, from control circuit 17, as an input 15 to the digital-to-analogue converter 13 by the microprocessor as shown in FIG. 1. Alternatively, if the disc drive microprocessor is too slow or too busy, the digital-to-analogue converter can be driven by hardware that consists of an electronic counter, a read-only memory and associated logic, the exact details of which, including its assembly, are apparent to those skilled in the art from the foregoing description.

The analogue equivalent, designated as reference signal "R" in FIG. 1, is outputted from the digital to analogue converter 13 at 19, and is then subtracted from the head sensor tracking signal "E" appearing at output 11 of the head sensor 1, and the resulting difference signal is inputted via lead 23 to the input of the track and hold circuit 25, and this difference is presented at output 27 to the input of the inverter 29. The output 31 of inverter 29 is a polarity-correlated error signal "e", which is applied to the input of servo circuit 5.

In operation, at such time as the associated control circuitry 17 determines that a track jump is to occur, the elements of that control circuit contain information as to the present position of the sensor head and the position to which the sensor head is to be moved, such as from track number "0" to track number "8", as shown in FIG. 2, a jump of 8 tracks in the example discussed in the preceding figures. It is to be understood that any number of tracks may be jumped, with corresponding information relating to all permitted track jumps, programmed or stored within the control circuitry 17.

At the time a jump is to be performed, the control circuitry 17 at that time issues an accelerate signal to driver 3 on input 7 in FIG. 1, with the "accelerate signal" represented by waveform 70 in FIG. 5c. As a result, the command causes an open loop acceleration of the servo head. The detailed mechanisms that actually move the head are not illustrated, but are conventional in the disc drive art.

The associated circuitry in control circuit 17 generates digital information that represents, in digital form, the idealized waveform of the type described in connection with FIGS. 3 and 4, which digital information is based on the information as to the present track position and the final track position anticipated after the desired number of tracks to be jumped. In the preferred form, this digital information, on the idealized or perfect jump, is synthesized mathematically and, for example, is of the form $R = \sin Kt^2$, where t represents time and K represents an empirically determined constant. Thus, the control circuitry 17 supplies digital numbers at input 15 of digital-to-analogue converter 13 that are representative of the instantaneous value of reference signal amplitude as of the given point in time. The digital-to-analogue converter 13 converts that digital information into an analogue signal "R", which signal is represented in FIG. 4, which is the output at lead 19.

By reference to FIGS. 3 through 5d, the waveform of FIG. 3 shows relevant time intervals, such as $T_0$, $T_1$, $T_2$, $T_3$, etc., which are designated times at which certain events occur, these events being correlated to the time by the vertical broken lines. The track and hold gating signal 33 (in FIG. 1) is depicted as waveform 72 in FIG. 5a, the normal/invert gating signal 35 (in FIG. 1) is depicted as waveform 74 in FIG. 5b, the accelerate positive signal 7 (in FIG. 1) is depicted as waveform 70 in FIG. 5c, and the accelerate negative (or decelerate) signal 9 (in FIG. 1) is depicted as waveform 75 in FIG. 5d.

During the time interval between the start $T_0$ and $T_1$, the difference between reference signal "R" at 19 and the servo head tracking signal "E" generated by the head sensor 1 appearing at output lead 11, is applied at input 23 of track and hold circuit 25. The track and hold circuit 25, whose input signal is represented by waveform 50, during this same time interval, is in track condition. Similarly, the normal/invert signal 35, represented by waveform 74, is in a normal state, since the segment 51a is of a positive slope. Of course, as previously described, the accelerate positive signal 35, represented by waveform 70 is on, while the accelerate negative signal, represented by waveform 75, is off.

During the next time interval between $T_1$ and $T_2$, by reference to waveform 50 of FIG. 3, the idealized waveform is at the top, which as shown in FIG. 4, is not used as part of the synthesizing of the idealized or perfect signal waveform. During this time, the microprocessor in circuit 17 issues a hold signal, portion 72a of the waveform 72, which signal is applied at input 33 to place the track/hold circuit 25 in the hold condition. A normal signal of waveform 74 is still applied, along with the accelerate positive signal 7 of waveform 74. During this time, the servo head coasts, maintaining its acceleration.

During the time inverval between time $T_2$ and time $T_3$, the microprocessor places normal/invert circuit 29 in the invert condition (portion 74a) to reverse the polarity of the intertrack error signal. Simultaneously, the signal 33 to the track and hold circuit 25 is changed, as depicted at portion 72b of waveform 72, to issue a tracking signal. The reference signal "E" and sensor tracking signal "E", are, again, used to create a polarity corrected difference or error signal "e", at lead 31, which is input to the function generator 5, and to the driver 3, and during that interval the sensor head is thus again placed under closed loop control to control its motion.

During the time interval between time $T_3$ and $T_4$, the sensor head again coasts. The track and hold signal 33 is changed to hold (portion 72c of waveform 72), with the waveforms 70, 74 and 75 remaining unchanged. The process described is thus repeated.

The process continues until the sensor head is positioned at the mid-point, designated T/2 in FIG. 2, which is midway through the cycle between the initial position T-0 and the intended final position T-END. At that time, the microprocessor in circuitry 17 terminates the accelerate positive signal 7, as shown by portion 70a of waveform 70 in FIG. 5C and, instead, places an accelerate negative signal on lead 9 as represented by the portion 75a of waveform 75 in FIG. 5d. The process continues until the end time T-END, at which time the microprocessor in control circuit 17 terminates the accelerate negative signal 9. The sensor is now located over the correct track, that is, the requisite number of track jumps have been completed.

An alternative to microprocessor control as represented in block 17, is a hardware circuit consisting of logic elements and counters which drives a ROM, of conventional structure that contains the desired data. The ROM is outputted to D/A block 19. With that hardware arrangement, each time that the reference signal passes through zero an output is provided from the ROM. These outputs ("ZEROS") are counted down in order to determined the mid-point of the jump. In addition, a second set of outputs ("PREZEROS") from the ROM is counted down in order to provide a signal occurring prior to the mid-point. This signal is used to initiate deceleration of the head; it is advanced in time to compensate for the unavoidable delays associated with the head. A special group of "PREZEROES" prior to the end of a jump provides an advanced timing for the end of deceleration. A programmed delay in the start of the reference waveform compensates for the starting delay of the head.

If a specific program is written for each jump length, and many different lengths are required, the amount of memory may cause a problem. If available memory is exceeded in a particular design, additional approaches may be used. First, one need store only the program which synthesizes the reference signal for the longest jump that may be required. For shorter jumps, the middle portion of the synthesized signal may be depleted by using the following algorithm: In the program which synthesizes the reference signal R for the longest jump, "max track" make a program jump from [(actual track)/2] to [(max track−actual track)/2]. The result is a reference signal R which is correct for the actual number of tracks in the jump. If the jump is very long, a velocity limited or "flat top" profile may be required. This does not affect the basic technology described. It is noted that if the direction of the jump is reversed, the preceding description is changed by reversing the polarities of the reference signal and acceleration commands from those used in the preceding description.

It is believed that the foregoing description of the preferred embodiment of the invention is sufficient in detail to allow one skilled in the art to make and use the invention. However, it is expressly understood that the invention is not limited to the details disclosed for that purpose. Inasmuch as alternative elements which may be substituted for those described and improvements become apparent to those skilled in the art upon reading this specification. Accordingly, the invention is to be broadly construed within the full scope and the appended claims.

What is claimed is:

1. In a disc drive information storage device of the type used in a digitally controlled system that contains a rotatably mounted disc storage device having stored information arranged in tracks on the disc storage device; transducer means for reading information stored on each said disc track as said disc track is rotated past said transducer means; said transducer means being selectively positioned to a position over any of said tracks under control of a servomotor means; sensor means coupled to said transducer means for providing a sensor signal representative of the movement of said transducer means between tracks on said disc; means for controlling said servomotor means, including:

means for inputting digital commands to move said transducer means to a specific track of said disc;

means for providing a signal command to said servomotor means to accelerate and for providing a subsequent signal command to said servomotor means to decelerate responsive to said inputted command to position said transducer means over a specific track on said disc; and closed loop servo correcting means responsive to an error signal for causing said servomotor means to move responsive to the presence of said error signal, the improvement comprising:

means for generating a reference signal that simulates the movement of a transducer between a given disc track location and a second disc track location responsive to an inputted command to move to said second disc track location including:

means for sequentially supplying digital information representative of a signal amplitude of said reference signal;

digital-to-analogue converter means for converting said digital information to an analogue reference signal;

combining means for combining said sensor signal and said analogue reference signal in subtractive relationship for providing a difference signal;

track and hold circuit means having first and second inputs and an output, responsive to a control signal at a second input for holding the output constant at the instantaneous level of said difference signal applied to said first input at the time of application of the control signal to said second input and absent said control signal for supplying said difference signal at said first input to said output;

invert and normal circuit means having first and second inputs and an output, responsive to a control signal at said second input for inverting the output signal of said track and hold circuit means at said first input and applying it to said output; and said output of said invert and normal circuit means providing an error signal for coupling to the input of said closed loop servo correcting means whereby said closed loop servo correcting means more accurately controls track positioning of said transducer means.

2. The invention as defined in claim 1 wherein said disc storage device includes a disc of magnetic material and wherein said transducer means is responsive to magnetic flux.

3. The invention as defined in claim 1 wherein said disc storage device includes optical disc means and wherein said transducer means comprises laser light generating and receiving means responsive to the shape of optical discontinuities of said disc means.

4. The invention as defined in claim 2 wherein said disc comprises a removable disc.

5. The invention as defined in claim 3 wherein said disc means includes a removable disc.

6. In a closed loop servomotor controlled disc drive system containing transducer means for reading information stored on said disc and positionable by a servomotor to individual tracks in said disc, and sensor means for providing a tracking signal responsive to movement of said transducer, the improvement comprising:
   means for generating a reference signal simulating sensor means tracking signals obtained during correct movement of said transducer means and substracting said reference signal from said tracking signal to provide a difference signal; and
   means for applying said difference signal to the control loop of said servo loop control servomotor controlled disc drive system.

7. In a disc drive head positioning system for enabling selective movement of the head across a given number of tracks of the disc, the combination comprising:
   means for generating a first synthetized reference signal as a representation of a perfect signal which would be outputted by the tracking sensor of the disc drive head during a theoretically perfect movement across the given number of tracks to the desired disc track;
   means for providing a second signal representative of the actual location of the disc drive head;
   means for mathematically combining said first and second signals for generating an error signal; and
   means responsive to the error signal for controlling the position of the disc drive head.

8. The system of claim 7 wherein said means for mathematically combining includes means for subtractively combining said first and second signals.

9. The system of claim 7 wherein said first signal is an analogue signal, and said second signal is an analogue signal.

10. In a disc drive head positioning system, a method for enabling selective movement of the head across a given number of tracks of the disc, said method comprising:
   generating a first synthesized reference signal as a representation of a perfect signal which would be outputted by the tracking sensor of the disc drive head during a theoretically perfect movement across the given number of tracks to the desired disc track;
   providing a second signal representative to the actual location of the disc drive head;
   mathematically combining said first and second signals for generating an error signal; and
   controlling the position of the disc drive head in response to the error signal.

11. The method of claim 10 wherein the step of mathematically combining includes subtractively combining said first and second signals.

12. The method of claim 12 wherein said first and second signals are analogue signals.

13. The method of claim 10 wherein the step of generating a first signal includes providing a digital representation of said reference signal and converting said digital signal to an analog signal.

14. A method for effecting a jump of a given number of tracks in a disc drive information storage device of the type used in a system that contains a rotatably mounted disc storage device having stored information arranged in tracks on the disc storage device, with transducer means for reading information stored on each said disc track as said disc track is rotated past said transducer means, with said transducer means being selectively positioned to a position over any of said tracks under control of a servomotor means, with sensor means coupled to said transducer means for providing a sensor signal representative of the movement of said transducer means between tracks on said disc, with means for controlling said servomotor means, the method comprising:
   providing a reference signal simulating the sensor means tracking signals obtained during correct movement of said transducer means for a jump of said given number of tracks;
   mathematically combining said reference signal with said sensor signal during movement of said transducer means for generating an error signal; and
   applying said error signal to said means for controlling said servomotor means.

15. In a closed loop servomotor controlled disc drive system containing transducer means for reading information stored on said disc and positionable by a servomotor to individual tracks on said disc, and sensor means for providing a tracking signal responsive to movement of said transducer, the improvement comprising:
   means for generating a synthesized digital reference signal as a representation of a perfect signal which would be outputted by the tracking sensor of the disc drive head during a theoretically perfect movement across the given number of tracks to the desired disc track in a given time, said reference signal being derived from a generally quasi-sinusoidal waveform and containing segments of information representative of on-track transducer positions and inter-track transducer positions;
   processor means;
   means for supplying from said processor means, in sequence, said segments of information representative of said reference signal;
   digital-to-analogue converter means for converting the digital information of said segments to an analogue reference signal;
   means for combining said sensor signal and said analogue reference signal in subtractive relationship for providing a difference signal;
   track and hold circuit means for receiving said difference signal as a first input;
   normal and invert circuit means for receiving, as a first input, the output of said track and hold circuit means;
   means for transmitting control signals from said processor means to a second input of each of said track and hold circuit means and said normal and invert circuit means in synchronization with the occurrence of each sequential segment of said reference signal for providing a polarity corrected error signal to the servomotor; and
   means within said processor means for providing to said servomotor an accelerate signal upon supplying from said processor means the first of said segments, and for providing to said servomotor means a decelerate signal at a time corresponding to about one-half of said given time whereby said servomotor is controlled in response to said error signal and said accelerate and decelerate signals.

* * * * *